(12) United States Patent
Joscelyne

(10) Patent No.: US 10,296,760 B2
(45) Date of Patent: May 21, 2019

(54) SYSTEM OF SHARED SECURE DATA STORAGE AND MANAGEMENT

(71) Applicant: IXUP IP Pty Ltd, Sydney, New South Wales (AU)

(72) Inventor: Dean Joscelyne, Sydney (AU)

(73) Assignee: IXUP IP PTY LTD, Sydney, New South Wales (AU)

( * ) Notice: Subject to any disclaimer, the term of this patent is extended or adjusted under 35 U.S.C. 154(b) by 0 days.

(21) Appl. No.: 15/321,326

(22) PCT Filed: Jun. 26, 2015

(86) PCT No.: PCT/AU2015/050356
§ 371 (c)(1),
(2) Date: Dec. 22, 2016

(87) PCT Pub. No.: WO2015/196257
PCT Pub. Date: Dec. 30, 2015

(65) Prior Publication Data
US 2017/0147836 A1     May 25, 2017

(30) Foreign Application Priority Data
Jun. 26, 2014    (AU) ................................ 2014902461

(51) Int. Cl.
*G06F 21/60* (2013.01)
*G06F 21/62* (2013.01)

(52) U.S. Cl.
CPC ........ *G06F 21/6227* (2013.01); *G06F 21/602* (2013.01)

(58) Field of Classification Search
CPC ........................... G06F 21/6227; G06F 21/602
USPC .......................................................... 713/193
See application file for complete search history.

(56) References Cited

U.S. PATENT DOCUMENTS

| | | |
|---|---|---|
| 2007/0150517 A1 | 6/2007 | Malone |
| 2009/0192998 A1 | 7/2009 | Paulsen |
| 2012/0047436 A1 | 2/2012 | Giblin |
| 2013/0329086 A1 | 12/2013 | Malone |

OTHER PUBLICATIONS

Written Opinion of the International Searching Authority in PCT/AU2015/050356 (dated Sep. 11, 2015).

*Primary Examiner* — Kambiz Zand
*Assistant Examiner* — Benjamin A Kaplan
(74) *Attorney, Agent, or Firm* — Finnegan, Henderson, Farabow, Garrett & Dunner, LLP

(57) ABSTRACT

This disclosure relates to a storage provider for storing first encrypted data associated with first meta tags from a first publisher and second encrypted data associated with second meta tags from a second publisher. The storage provider consolidates the first meta tags and the second meta tags to determine unencrypted consolidated meta tags. The storage provider then stores the encrypted first data associated with the unencrypted consolidated meta tags and stores the encrypted second data associated with the unencrypted consolidated meta tags. Since the meta tags are consolidated, less storage is required and the data and the meta tags can be stored more efficiently. This is an advantage over other methods that encrypt the meta tags and the data and therefore do not consolidate the meta tags.

11 Claims, 5 Drawing Sheets

SYSTEM OF SHARED SECURE DATA STORAGE AND MANAGEMENT

CROSS-REFERENCE TO RELATED APPLICATIONS

The present application is a national phase application of International Application No. PCT/AU2015/050356, filed Jun. 26, 2015, and claims priority from Australian Provisional Patent Application No 2014902461 filed on 26 Jun. 2014, the content of both of which is incorporated herein by reference.

TECHNICAL FIELD

This disclosure relates to storing and accessing data associated with meta tags.

BACKGROUND

Data storage is well known in the art. A goal of many data management systems is to store large amounts of data on large specialised highly efficient storage systems. This approach allows efficiencies that are unique to large fast hardware and software based facilities. Another goal of efficient data systems is to detect duplication of data to minimise the space used.

One key factor that stands in the way of the efficient storage of data is that data security typically dictates that each user or company have their own secure data storage area, and in most cases, that the data be stored at inefficient smaller, slower and less powerful data management facilities leading to increased costs and slower performance.

A common practice is to tag data using a system of meta tags with related meta tag data which is in turn associated with specific data files. This approach is currently popular with large media storage systems such as YouTube for video, or iTunes for audio and movie data. However meta tags are not limited to media file types and can be associated with any file type.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

SUMMARY

There is provided a method as performed by a storage provider for storing first encrypted data associated with first meta tags from a first publisher and second encrypted data associated with second meta tags from a second publisher. The method comprises:
consolidating first meta tags and second meta tags to determine unencrypted consolidated meta tags;
storing the first encrypted data associated with the unencrypted consolidated meta tags; and
storing the second encrypted data associated with the unencrypted consolidated meta tags.

Since the meta tags are consolidated, less storage is required and the data and the meta tags can be stored more efficiently. This is an advantage over other methods that encrypt the meta tags and the data and therefore do not consolidate the meta tags.

Storing the first encrypted data may comprise storing the first encrypted data on a shared data store and storing the second encrypted data comprises storing the second encrypted data on the same shared data store.

The method may further comprise:
decrypting the first encrypted data to obtain first decrypted data;
decrypting the second encrypted data to obtain second decrypted data;
determining a deduplicated data set based on the first decrypted data and the second decrypted data;
using a secure shared key to encrypt the deduplicated data set to obtain an encrypted deduplicated data set; and
sending the secure shared key to the first publisher and to the second publisher.

There is further provided a data storage computer system comprising: a data port to receive first encrypted data associated with first meta tags from a first publisher and second encrypted data associated with second meta tags from a second publisher; and a processor
to consolidate the first meta tags and second meta tags to determine unencrypted consolidated meta tags,
to store the first encrypted data associated with the unencrypted consolidated meta tags; and
to store the second encrypted data associated with the unencrypted consolidated meta tags.

There is further provided a method as performed by a data publisher for storing data at a storage provider, the data being associated with meta tags. The method comprises:
encrypting the data to obtain encrypted data; and
transferring the encrypted data associated with the meta tags to the storage provider, the meta tags being unencrypted meta tags, such that the storage provider consolidates the unencrypted meta tags with other meta tags already stored by the storing provider and stores the encrypted data associated with the unencrypted meta tags on a data store.

The encrypted data may include an identity of a key used to encrypt the data.

The method may further comprise:
normalising the meta tags at the data publisher with the meta tags at the storage provider to obtain normalised meta data; and
uploading the normalised meta data to shared storage at the storage provider.

Storing the encrypted data associated with the unencrypted meta tags may comprise maintaining a link to the encrypted data.

There is further provided a data publisher computer system for storing data at a storage provider, the data being associated with meta tags, the data publisher computer system comprising:
a processor to encrypt the data to obtain encrypted data; and
a data port to transfer the encrypted data associated with the meta tags to the storage provider, the meta tags being unencrypted meta tags, such that the storage provider consolidates the unencrypted meta tags with other meta tags already stored by the storing provider and stores the encrypted data associated with the unencrypted meta tags on a data store.

There is provided a method for accessing encrypted data that is on a shared storage at a storage provider. The method comprises:

searching for data using meta tags to find requested encrypted data;

requesting access to an encryption key from a publisher;

downloading the requested encrypted data; and completing the decryption and making the data available for use.

There is further provided a computer system for accessing encrypted data that is on a shared storage at a storage provider, the computer system comprising:

a processor to search for data using meta tags to find requested encrypted data;

to request access to an encryption key from a publisher;

to download the requested encrypted data; and to complete the decryption and to make the data available for use.

Optional features described of any aspect of method, computer readable medium, software or computer system, where appropriate, similarly apply to the other aspects also described here.

BRIEF DESCRIPTION OF DRAWINGS

An example will now be described with reference to.

DESCRIPTION OF EMBODIMENTS

One way of realising efficiency is to reduce duplication of not only data files, but meta tags and associated metadata. This could be achieved by normalising meta tags to use similar tag descriptions and even meta tag data, where appropriate, however such a practice is not commonly available in large unstructured data storage facilities.

This advantage could also be applied to shared storage space where the data may be encrypted using keys owned and managed by the publisher, but the metadata associated with the encrypted file could remain unencrypted and managed in such a way so as to increase the speed, efficiency and capacity of the data management system in a similar way to today's large and highly efficient media data storage facilities do.

The described invention is designed to address these issues.

Figure 1:
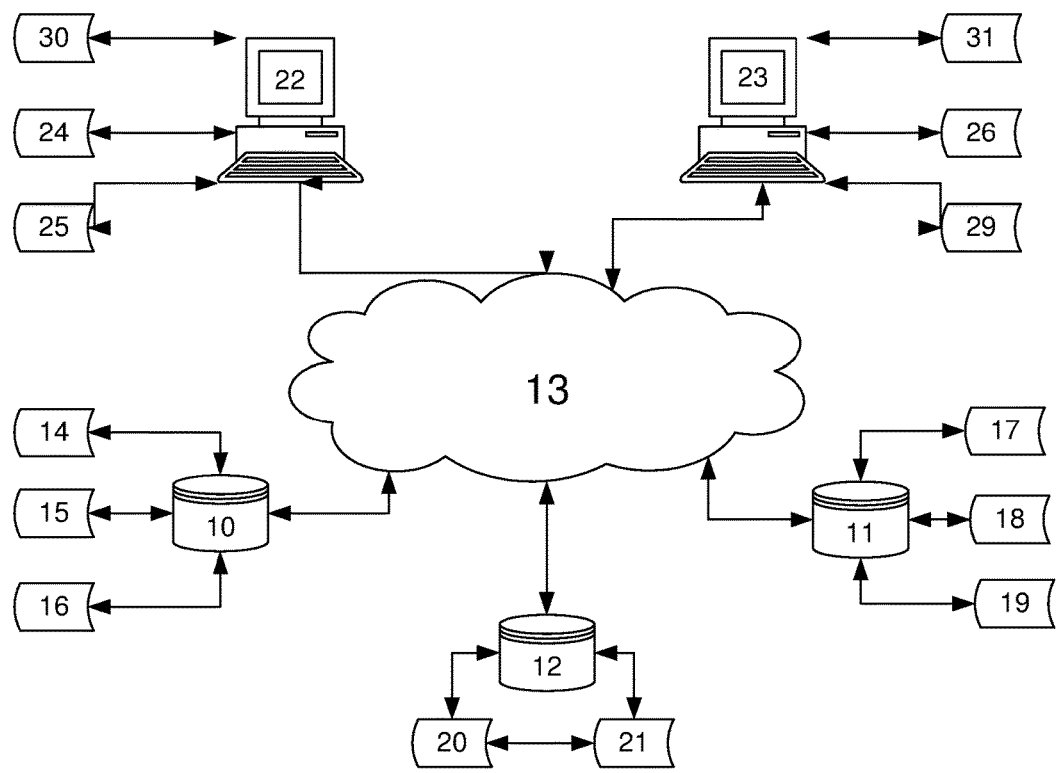
FIG. 1 illustrates main components of the example embodiment.

FIG. 1 shows the main components of the example embodiment. The publisher of data in a standalone data system 10 wishes to consolidate their data with other data publisher's 11 in one shared data storage facility 12. The publishers 10 11 and the shared data store 12 are connected over a network such as the Internet 13. Also individuals 22 23 may wish to store information on a central database 12 and these may also be connected over a network such as the Internet 13. Each party 10 22 23 11 wishing to store or retrieve information with a central storage facility 12 would use three related pieces of information for each data piece to be stored on the shared secure storage. For each piece of data to be stored there is the data itself 15 24 26 18, a related meta tag set 14 30 31 17 with meta tag settings and an encryption key 16 25 29 19 for each data file 15 24 26 18 to be stored.

In each case 10 22 23 11 when data is to be stored on the shared secure storage facility 12 the data 15 24 26 18 is encrypted with a local encryption key 16 25 29 19 and stored on the shared storage 12 as an encrypted file in each case 21. Each stored encrypted file 21 is linked to a set of metadata related to the encrypted data 20 which also includes the identity of the key used 16 25 29 19 in each case.

The advantage of this system is that meta tags are not duplicated and any duplicates of non-encrypted data can be deleted leading to less storage space being used and more efficient organisation of data.

Figure 2:
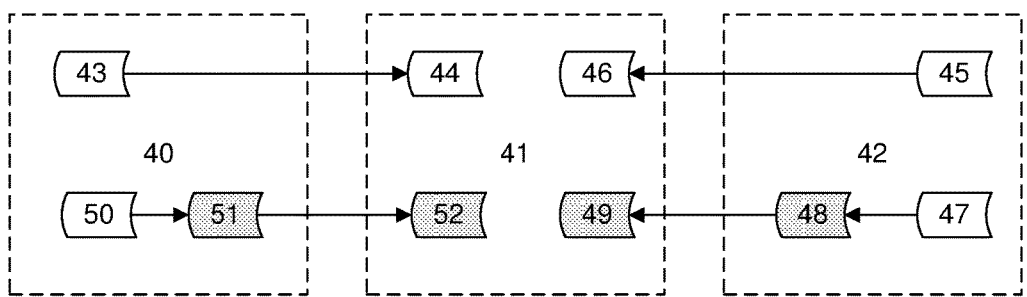
FIG. 2 illustrates a data consolidation process of the example embodiment.

FIG. 2 shows the data consolidation process of the example embodiment. A user 40 wishes to store data on a shared data store 41. A second user 42 also wants to use the shared data store 41. Initially the user 40 has an unencrypted version 50 of the data to be stored and related metadata 43. A second user 42 also has unencrypted data 47 with related metadata 45 to store on the shared storage 41.

When the user 40 decides to store the data 50, the user encrypts the data 51 and then stores it 52 on the shared storage 41. The metadata 43 related to the data 50 is not encrypted but is maintained 44 in a link to the encrypted version of the data 51 as it is stored 52 on the shared storage 41. Any duplication of meta tags is consolidated to save space.

In another instance of the same process, another user 42 wants to submit a data file 47 with the accompanying metadata 45. The data 47 is converted into an encrypted version of the same data 48 and then transferred to the shared storage 41 in the form of the encrypted file 49. The metadata 45 accompanying the original file 47 is transferred to the shared storage system 41 and left in an unencrypted state 46 where a link between the metadata 46 and the file that is the subject of the metadata 49 is maintained.

With this system any duplications of metadata tags can be consolidated in order to save space and any duplication of unencrypted files that are submitted to the shared space can be consolidated to increase speed, efficiency and save space.

Figure 3:
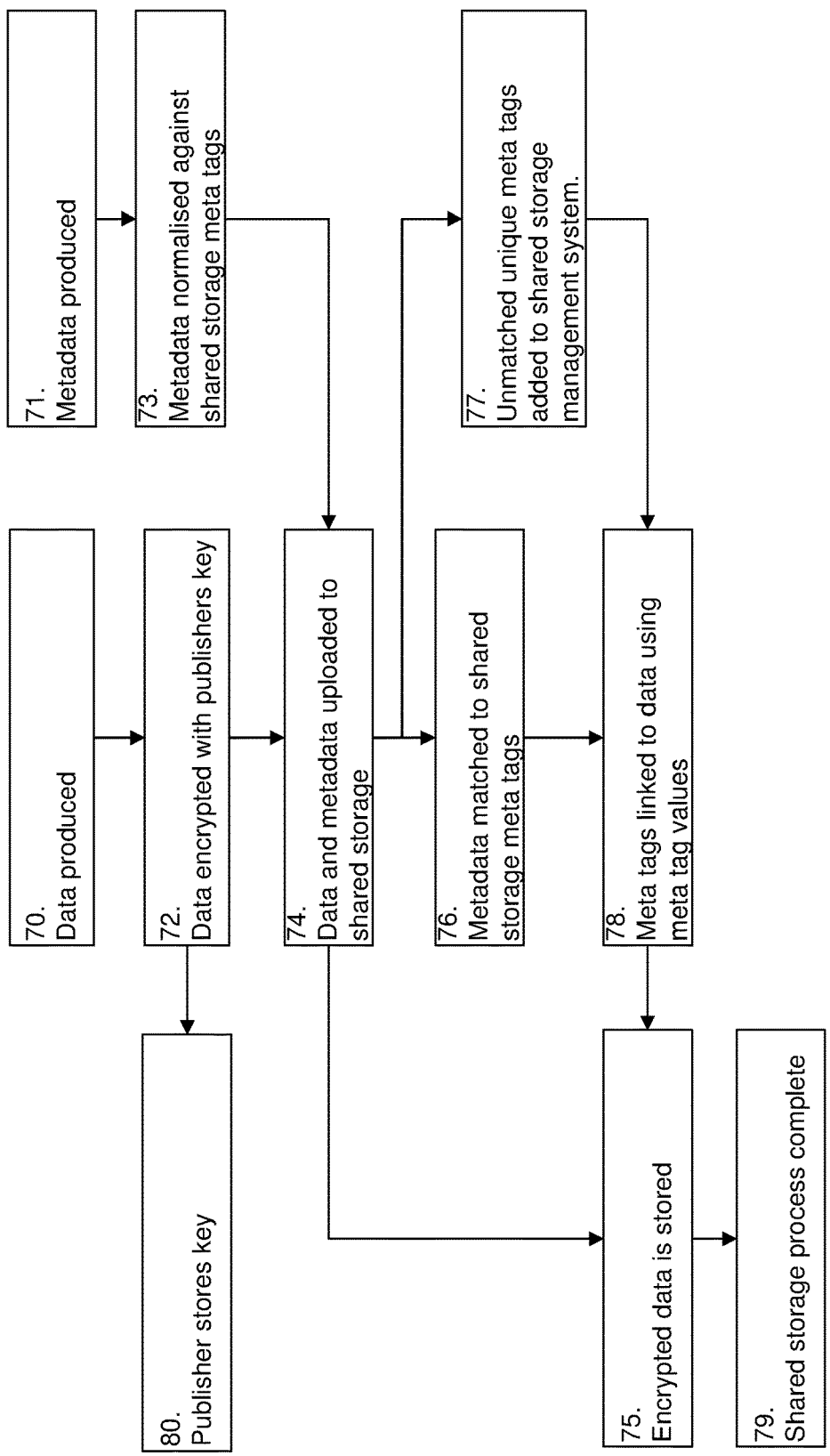
FIG. 3 illustrates a control process of the data consolidation system using the example embodiment.

FIG. 3 discloses a controlled process of the data consolidation system using the example embodiment. Typically when a file is produced the data within the file and the metadata are both produced at a similar time. The data that is produced 70 and the metadata that is produced are both then processed. The data that is produced is encrypted 72 and the key used to encrypt the data is stored by the publisher 80.

When the metadata is produced it is ideal for the metadata to be normalised with the meta tags used on the shared storage system 73. This is a step that is ideal but not mandatory in the example embodiment.

The now encrypted data 72 and the normalised metadata 73 are uploaded to the shared storage 74. Subsequently the encrypted data is stored 75 and the metadata is matched with the meta tags already available in shared storage 76.

Subsequently those meta tags are linked to the data using meta tag values 78. If the meta tags coming from the publisher do not match the meta tags used in the shared storage system then those meta tags are added to the storage management system 77 and then linked to the data using meta tag values 78.

Figure 4:
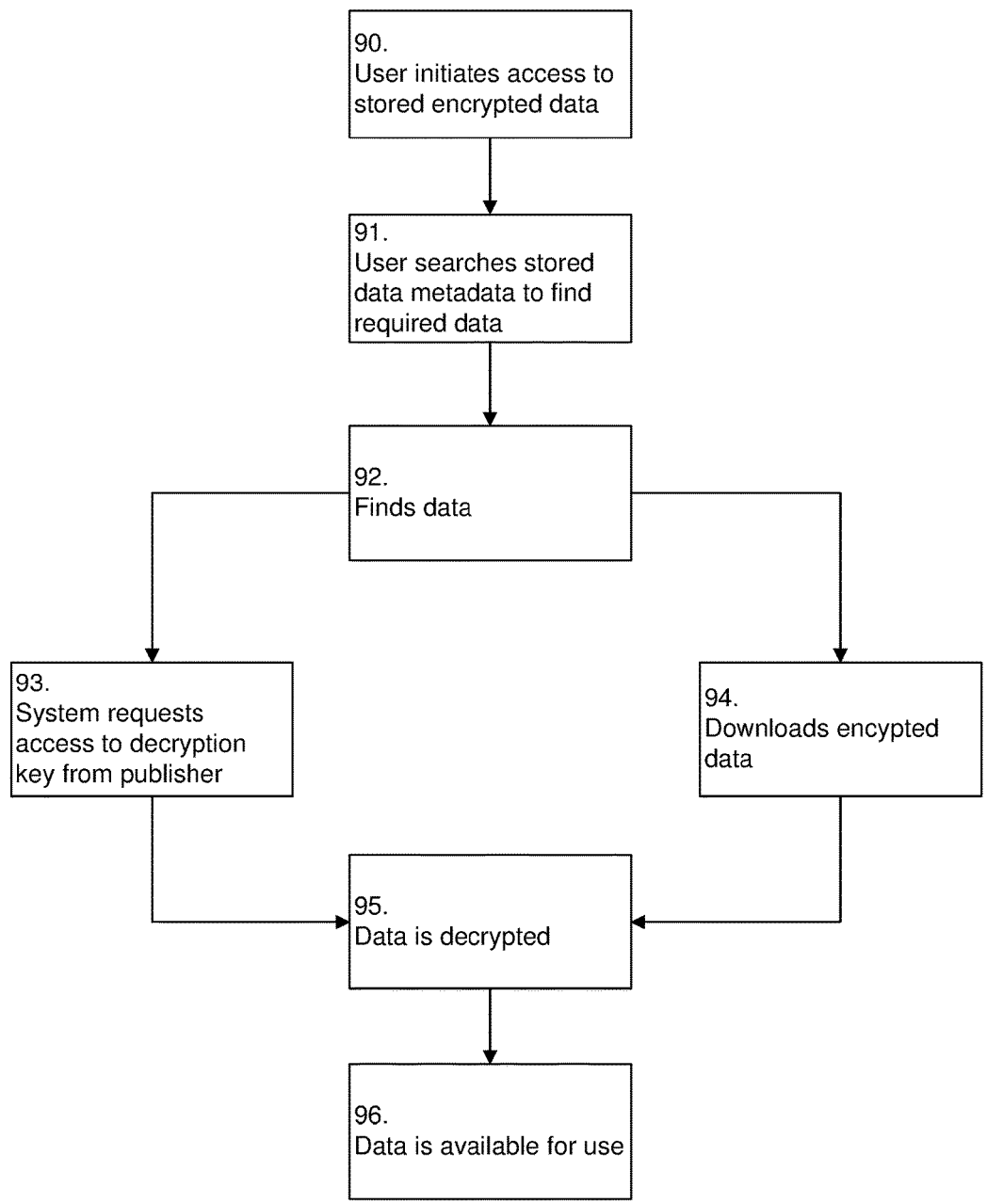
FIG. 4 illustrates a control process for data retrieval and use using the example embodiment.

Once that linking to the encrypted data that is stored 75 is complete the shared storage process is now complete 79. FIG. 4 discloses the control process for data retrieval and use using the example embodiment. Initially a user wishes to access encrypted data that is on the shared storage facility 90. The user searches for the data using meta tags and metadata 91 and finds the requested encrypted data 92. To use the encrypted data the user must request access to the encryption keys from the publisher 93 and they also download the encrypted data 94 in order to complete the decryption of the data 95 and make it available for use 96. The example embodiment shows a system that enables encrypted data from many sources to be used at the one storage location with the consolidation of meta tags and in some cases meta tag values and consolidation of unencrypted data if that is part of the information to be stored by the publisher.

Alternative Embodiments

The example embodiment shows a system where the encryption keys for the encryption and decryption of data is stored and maintained by the publisher themselves. An alternative embodiment could see the encryption keys being used in many different scenarios including but not limited to the service securely managing keys on behalf of the publisher as well as third party services managing keys for example in a situation where data is published to various recipients in a commercial arrangement and based on payment for copyright.

The example embodiment does not disclose how the meta tags are normalised. This is known in the art however for clarification and simplification it involves an index of all existing meta tags on the shared storage service which can be accessed and used to look for meta tags that fulfil the same role as the meta tags chosen by the publisher at the time the data was created.

The example embodiment discloses a system where it is not typically anticipated that the data relating to each meta tag is duplicated to a large degree. An alternative embodiment could actually achieve consolidation by minimising the duplication of meta tag values that are associated with individual stored data files in the system.

The example embodiment discloses a system where data is stored in a common store area where meta tag duplicate data and meta tag value duplicate data is minimised and only encrypted data is kept in seclusion from the service provider and publisher of other data on the same stored system. Another alternative embodiment could see the encrypted data from multiple publishers being temporarily entrusted to the service provider so that it can search for duplicate data instances and then provide a secure shared key of a consolidated deduplicated data set to the respective publishers of the original unconsolidated data, undertaking to maintain the privacy and security of the nature of the overlap of data while allowing further index efficiency and speed as well as a reduction in the storage space required.

Figure 5:
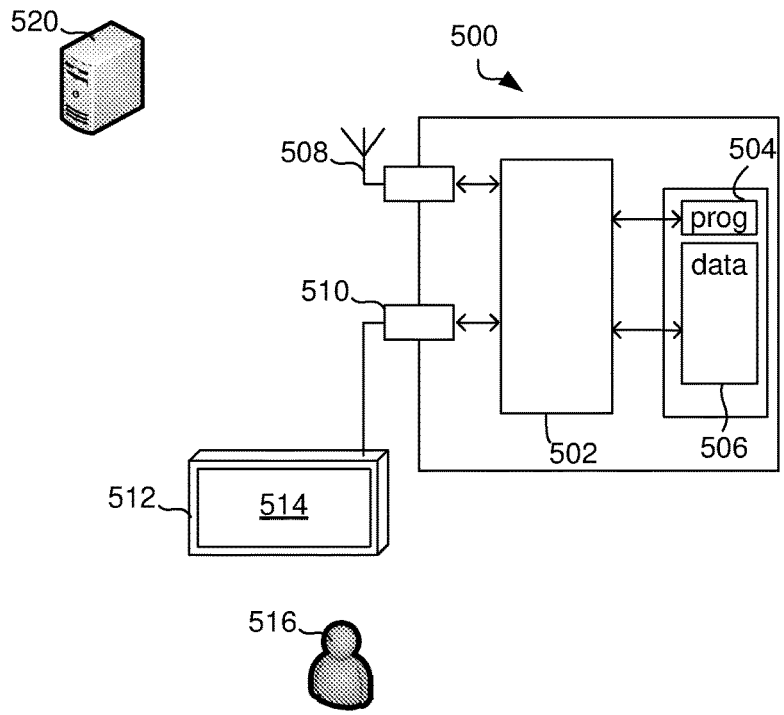
FIG. 5 illustrates a computer system for storing first encrypted data and second encrypted data.

FIG. 5 illustrates a computer system 500 for storing first encrypted data and second encrypted data. The computer system 500 comprises a processor 502 connected to a program memory 504, a data memory 506, a communication port 508 and a user port 510. The program memory 504 is a non-transitory computer readable medium, such as a hard drive, a solid state disk or CD-ROM. Software, that is, an executable program stored on program memory 504 causes the processor 502 to perform the method in FIG. 6, that is, processor 502 consolidates meta tags and stores encrypted data associated with the meta tags on data store 506, such as on RAM or a processor register.

The processor 502 may receive data, such as encrypted data, from data memory 506 as well as from the communications port 508 and the user port 510, which is connected to a display 512 that shows a visual representation 514 of the data to a user 516. In one example, the processor 502 receives data from publisher 520 via communications port 508, such as by using a Wi-Fi network according to IEEE 802.11. The Wi-Fi network may be a decentralised ad-hoc network, such that no dedicated management infrastructure, such as a router, is required or a centralised network with a router or access point managing the network.

In one example, the processor 502 receives and processes the data in real time. This means that the processor 502 consolidates the meta tags every time data is received from the publisher 520 and completes this calculation before the publisher 520 sends the next data update.

Although communications port 508 and user port 510 are shown as distinct entities, it is to be understood that any kind of data port may be used to receive data, such as a network connection, a memory interface, a pin of the chip package of processor 502, or logical ports, such as IP sockets or parameters of functions stored on program memory 504 and executed by processor 502. These parameters may be stored on data memory 506 and may be handled by-value or by-reference, that is, as a pointer, in the source code.

The processor 502 may receive data through all these interfaces, which includes memory access of volatile memory, such as cache or RAM, or non-volatile memory, such as an optical disk drive, hard disk drive, storage server or cloud storage. The computer system 500 may further be implemented within a cloud computing environment, such as a managed group of interconnected servers hosting a dynamic number of virtual machines.

It is to be understood that any receiving step may be preceded by the processor 502 determining or computing the data that is later received. For example, the processor 502 determines sanitised and stores the sanitised data in data memory 506, such as RAM or a processor register. The processor 502 then requests the data from the data memory 506, such as by providing a read signal together with a memory address. The data memory 506 provides the data as a voltage signal on a physical bit line and the processor 502 receives the data via a memory interface.

It is to be understood that throughout this disclosure unless stated otherwise, nodes, edges, graphs, solutions, variables and the like refer to data structures, which are physically stored on data memory 506 or processed by processor 502. Further, for the sake of brevity when reference is made to particular variable names, such as "meta tag" or "value" this is to be understood to refer to values of variables stored as physical data in computer system 500.

Figure 6:
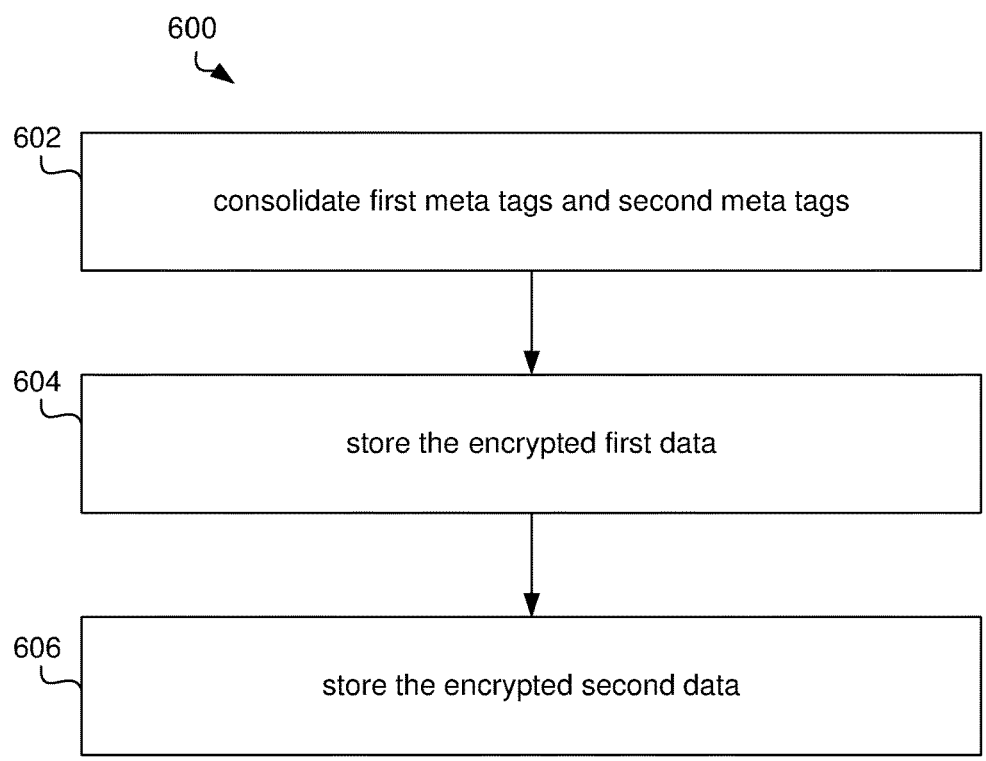
FIG. 6 illustrates a method for storing first encrypted data associated with first meta tags from a first publisher and second encrypted data associated with second meta tags from a second publisher.

FIG. 6 illustrates a method 600 as performed by processor 502 for storing first encrypted data associated with first meta tags from a first publisher and second encrypted data associated with second meta tags from a second publisher as described above. Processor 502 consolidates 602 first meta tags and second meta tags to determine unencrypted consolidated meta tags.

Processor 502 then stores 604 the first encrypted data associated with the unencrypted consolidated meta tags and stores 606 the second encrypted data associated with the unencrypted consolidated meta tags.

FIG. 6 is to be understood as a blueprint for a data management software program and may be implemented step-by-step, such that each step in FIG. 6 is represented by a class or function in a programming language, such as C++ or Java. The resulting source code is then compiled and stored as computer executable instructions on program memory 504.

Figure 7:
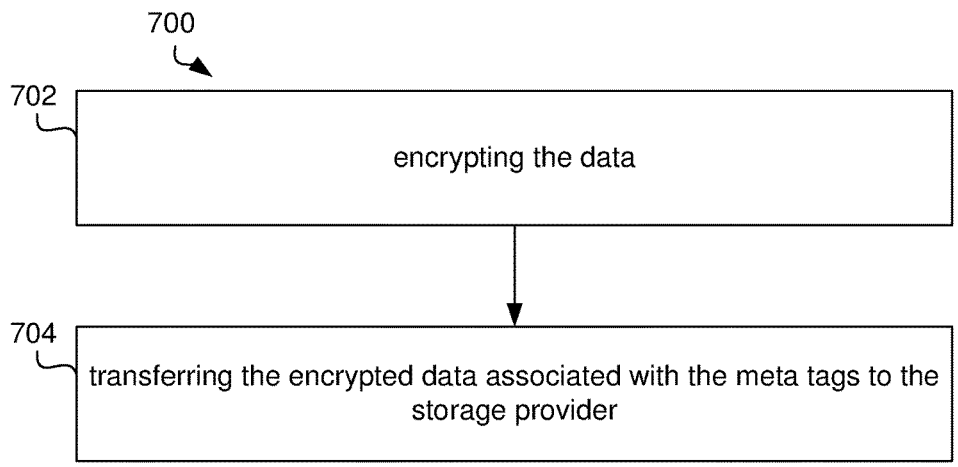
FIG. 7 illustrates a method as performed by a data publisher for storing data at a storage provider.

FIG. 7 illustrates a method 700 as performed by a data publisher for storing data at a storage provider, the data being associated with meta tags. The computer system of the data publisher has similar components as illustrated in FIG. 5 and therefore, this figure is not repeated here but reference numeral 502 is used to refer to the processor of the data publisher.

According to method 700, processor 502 of the data publisher encrypts 702 the data to obtain encrypted data. Processor 502 then transfers 704 over data port 508 the encrypted data associated with the meta tags to the storage provider. The meta tags are unencrypted meta tags, such that the storage provider consolidates the unencrypted meta tags with other meta tags already stored by the storing provider and stores the encrypted data associated with the unencrypted meta tags on a data store.

Figure 8:
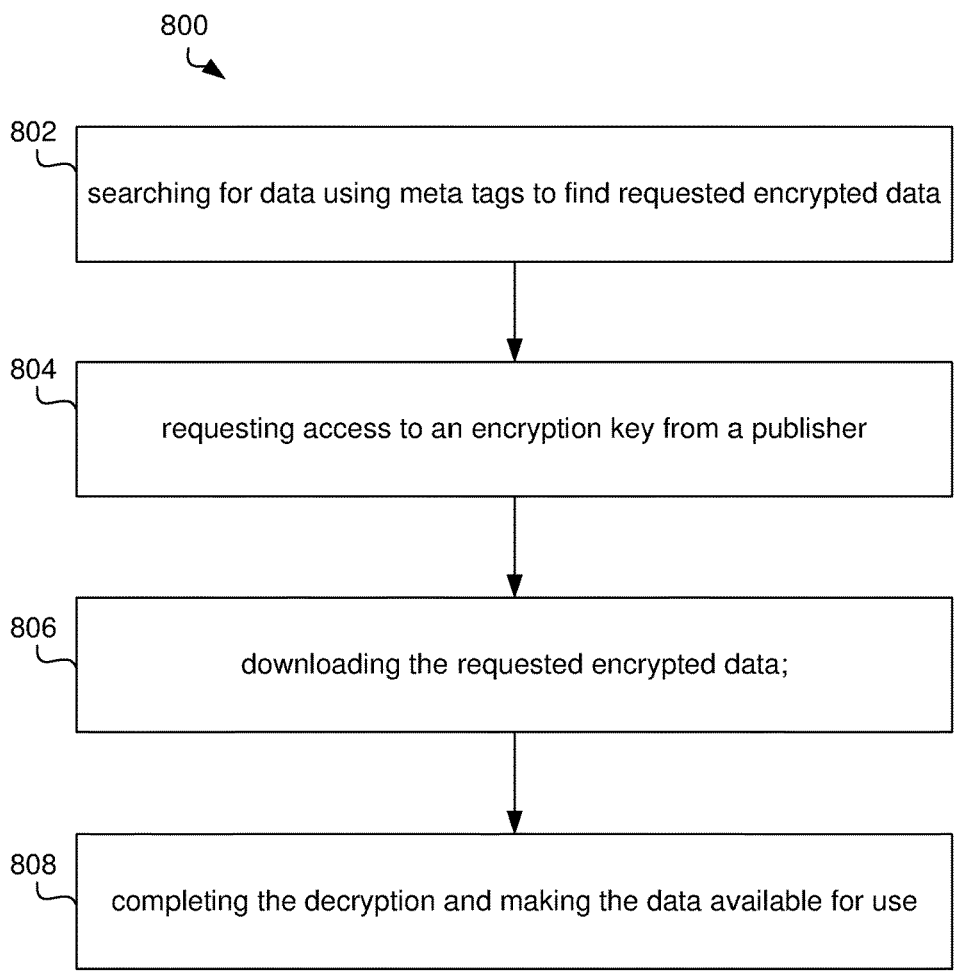
FIG. 8 illustrates a method for accessing encrypted data that is on a shared storage at a storage provider.

FIG. 8 illustrates a method 800 for accessing encrypted data that is on a shared storage at a storage provider. Method 800 may be performed by the storage provider and therefore, the computer system illustrated in FIG. 5 can be used to implement method 800 with processor 502 performing the steps illustrated in FIG. 8.

More particularly, processor 502 searches 802 for data using meta tags to find requested encrypted data and requests 804 access to an encryption key from a publisher. Processor 502 then downloads 806 the requested encrypted data and completes 808 the decryption and makes the data available for use.

It will be appreciated by persons skilled in the art that numerous variations and/or modifications may be made to the specific embodiments without departing from the scope as defined in the claims.

It should be understood that the techniques of the present disclosure might be implemented using a variety of technologies. For example, the methods described herein may be implemented by a series of computer executable instructions residing on a suitable computer readable medium. Suitable computer readable media may include volatile (e.g. RAM) and/or non-volatile (e.g. ROM, disk) memory, carrier waves and transmission media. Exemplary carrier waves may take the form of electrical, electromagnetic or optical signals conveying digital data steams along a local network or a publically accessible network such as the internet.

It should also be understood that, unless specifically stated otherwise as apparent from the following discussion, it is appreciated that throughout the description, discussions utilising terms such as "estimating" or "processing" or "computing" or "calculating", "optimising" or "determining" or "displaying" or "maximising" or the like, refer to the action and processes of a computer system, or similar electronic computing device, that processes and transforms data represented as physical (electronic) quantities within the computer system's registers and memories into other data similarly represented as physical quantities within the computer system memories or registers or other such information storage, transmission or display devices.

The present embodiments are, therefore, to be considered in all respects as illustrative and not restrictive.

The invention claimed is:

1. A method as performed by a storage provider for storing first encrypted data associated with first meta tags from a first publisher and second encrypted data associated with second meta tags from a second publisher, the method comprising:
consolidating any duplications of the first meta tags and the second meta tags to determine unencrypted consolidated meta tags by minimizing the duplication of meta tag values that are associated with encrypted data;
storing the unencrypted consolidated meta tags;
storing the first encrypted data associated with the unencrypted consolidated meta tags; and
storing the second encrypted data associated with the unencrypted consolidated meta tags.

2. The method of claim 1, wherein storing the first encrypted data comprises storing the first encrypted data on a shared data store and storing the second encrypted data comprises storing the second encrypted data on the same shared data store.

3. The method of claim 1, further comprising:
decrypting the first encrypted data to obtain first decrypted data;
decrypting the second encrypted data to obtain second decrypted data;
determining a deduplicated data set based on the first decrypted data and the second decrypted data;
using a secure shared key to encrypt the deduplicated data set to obtain an encrypted deduplicated data set; and
sending the secure shared key to the first publisher and to the second publisher.

4. A data storage computer system comprising:
a data port to receive first encrypted data associated with first meta tags from a first publisher and second encrypted data associated with second meta tags from a second publisher; and
a processor
to consolidate any duplications of the first meta tags and second meta tags to determine unencrypted consolidated meta tags by minimizing the duplication of meta tag values that are associated with encrypted data,
to store the first encrypted data associated with the unencrypted consolidated meta tags; and
to store the second encrypted data associated with the unencrypted consolidated meta tags.

5. A method as performed by a data publisher for storing data at a storage provider, the data being associated with meta tags, the method comprising:
encrypting the data to obtain encrypted data; and
transferring the encrypted data associated with the meta tags to the storage provider, the meta tags being unencrypted meta tags, such that the storage provider consolidates any duplications of the unencrypted meta tags with other meta tags already stored by the storing provider by minimizing the duplication of meta tag values that are associated with encrypted data and stores the encrypted data associated with the unencrypted meta tags on a data store.

6. The method of claim 5, wherein the encrypted data includes an identity of a key used to encrypt the data.

7. The method of claim 5, further comprising:
normalising the meta tags at the data publisher with the meta tags at the storage provider to obtain normalised meta data; and
uploading the normalised meta data to shared storage at the storage provider.

8. The method of claim 1, wherein storing the encrypted data associated with the unencrypted meta tags comprises maintaining a link to the encrypted data.

9. A data publisher computer system for storing data at a storage provider, the data being associated with meta tags, the data publisher computer system comprising:
- a processor to encrypt the data to obtain encrypted data; and
- a data port to transfer the encrypted data associated with the meta tags to the storage provider, the meta tags being unencrypted meta tags, such that the storage provider consolidates any duplications of the unencrypted meta tags with other meta tags already stored by the storing provider by minimizing the duplication of meta tag values that are associated with encrypted data and stores the encrypted data associated with the unencrypted meta tags on a data store.

10. A method for accessing encrypted data that is on a shared storage at a storage provider, the method comprising:
- searching for data using meta tags to find requested encrypted data, any duplications of the meta tags being consolidated by minimizing the duplication of meta tag values that are associated with the encrypted data;
- requesting access to an encryption key from a publisher;
- downloading the requested encrypted data; and
- completing the decryption and making the data available for use.

11. A computer system for accessing encrypted data that is on a shared storage at a storage provider, the computer system comprising:
- a processor
  - to search for data using meta tags to find requested encrypted data, any duplications of the meta tags being consolidated by minimizing the duplication of meta tag values that are associated with the encrypted data;
  - to request access to an encryption key from a publisher;
  - to download the requested encrypted data; and
  - to complete the decryption and to make the data available for use.

\* \* \* \* \*